(12) United States Patent
Stanescu et al.

(10) Patent No.: US 9,913,076 B2
(45) Date of Patent: Mar. 6, 2018

(54) COMMUNICATIONS ENABLED APPARATUS WITH A MULTI-MAC MANAGER AND A METHOD OF OPERATING THEREOF

(71) Applicants: Razvan-Tudor Stanescu, Bucharest (RO); Paul Marius Bivol, Bacau (RO); George-Lucian Capraru, Rosu (RO)

(72) Inventors: Razvan-Tudor Stanescu, Bucharest (RO); Paul Marius Bivol, Bacau (RO); George-Lucian Capraru, Rosu (RO)

(73) Assignee: NXP USA, Inc., Austin, TX (US)

( * ) Notice: Subject to any disclaimer, the term of this patent is extended or adjusted under 35 U.S.C. 154(b) by 267 days.

(21) Appl. No.: 14/564,770

(22) Filed: Dec. 9, 2014

(65) Prior Publication Data

US 2016/0105876 A1    Apr. 14, 2016

(30) Foreign Application Priority Data

Oct. 8, 2014   (RO) .................................. 2014 00751

(51) Int. Cl.
| | |
|---|---|
| *H04L 12/50* | (2006.01) |
| *H04W 4/00* | (2018.01) |
| *H04W 84/10* | (2009.01) |
| *H04W 88/06* | (2009.01) |
| *H04L 29/08* | (2006.01) |

(52) U.S. Cl.
CPC ............ *H04W 4/008* (2013.01); *H04L 69/324* (2013.01); *H04W 84/10* (2013.01); *H04W 88/06* (2013.01)

(58) Field of Classification Search
CPC ........................ H04N 21/6118; H04N 7/17309
USPC ........................................ 370/338, 389, 401
See application file for complete search history.

(56) References Cited

U.S. PATENT DOCUMENTS

| | | | |
|---|---|---|---|
| 5,394,433 A | | 2/1995 | Bantz et al. |
| 5,488,609 A | * | 1/1996 | Hluchyj ................ H04L 5/1446 370/232 |
| 6,643,278 B1 | | 11/2003 | Panasik et al. |
| 2002/0075941 A1 | | 6/2002 | Souissi et al. |
| 2005/0020299 A1 | | 1/2005 | Malone et al. |
| 2007/0191042 A1 | | 8/2007 | Chung et al. |
| 2008/0117850 A1 | | 5/2008 | Agrawal et al. |
| 2009/0046673 A1 | | 2/2009 | Kaidar |
| 2009/0141737 A1 | | 6/2009 | Ho |
| 2010/0284337 A1 | | 11/2010 | Luft et al. |
| 2010/0291942 A1 | | 11/2010 | Piipponen et al. |

(Continued)

OTHER PUBLICATIONS

U.S. Appl. No. 14/619,624, filed Feb. 11, 2015, entitled "Device for Multiple Pan Access".

(Continued)

*Primary Examiner* — Dang Ton

(57) ABSTRACT

The present application relates to a networking device with multi-MAC manager and a method of operating thereof. The multi-MAC manager receiving a request issued in the context of a medium access control, MAC, instance, determines the MAC, instance, to which the request relates and determines whether the PHY part is available for allocation or already allocated to the MAC instance. If the PHY is available, at least the PHY part of the communications interface is allocated to the MAC instance and the received request is passed to the PHY part for further processing thereat. At least the allocated PHY part is released once a service requested by the received request is completed.

16 Claims, 8 Drawing Sheets

(56) References Cited

U.S. PATENT DOCUMENTS

2013/0258921 A1 10/2013 Gevorkov et al.
2014/0056243 A1* 2/2014 Pelletier ................ H04W 74/04
                                                                370/329
2015/0263880 A1 9/2015 Wang et al.

OTHER PUBLICATIONS

Non-Final Office Action dated Dec. 7, 2016 for U.S. Appl. No. 14/619,624, 10 pages.
Final Office Action dated Jul. 12, 2017 for U.S. Appl. No. 14/619,624, 23 pages.
Notice of Allowance dated Oct. 18, 2017 for U.S. Appl. No. 14/619,624, 12 pages.

* cited by examiner

COMMUNICATIONS ENABLED APPARATUS WITH A MULTI-MAC MANAGER AND A METHOD OF OPERATING THEREOF

CROSS REFERENCE TO RELATED APPLICATION(S)

The present application claims priority to Romanian Patent Application No. RO A 2014 00751, entitled "A COMMUNICATIONS ENABLED APPARATUS WITH A MULTI-MAC MANAGER AND A METHOD OF OPERATING THEREOF," filed on Oct. 8, 2014, the entirety of which is herein incorporated by reference.

FIELD OF THE INVENTION

This invention relates to an apparatus and a method for managing network access to several networks of a single processing device and in particular to implementing multiple access points in a single processing device.

BACKGROUND OF THE INVENTION

Conventionally, communication medium protocol stacks have been single entities with top-level control interfaces and dedicated hardware resources. This means that a protocol stack presents a single entity and identity of the device, respectively, on the communication medium towards one or more other counterpart devices, with which the device is enabled to communicate using the communication medium.

In particular, the radio access protocol stack of wireless devices is typically implemented to present the wireless device as a single entity in a single physical network thereby acting in a single role at a point in time. This means that such wireless devices may either act as master or slave devices at a point in time from the network perspective. Switching between the role as master and slave, respectively, requires cancelling of the one or more currently established communication connections, reconfiguration of the role of the device and establishing new communication connection(s), which necessarily implies losing all ties to the former (network related) state of the device in the network. The device is not able to restore its former (network related) state in the network such as role, identity etc. without re-executing the network joining procedure.

Prior art WO 2009/083912 A2 published on Jul. 9, 2009 describes a controller, which is configured to instantiate a plurality of radio protocols and to operate the plurality of radio protocols with a physical layer. Each instantiation of a same radio protocol is embodied in a same code module and with associated data stored in a memory. The controller is further configured to execute each instantiation of a radio protocol so that a portion of resources are shared between different instantiations of radio protocols, and different instantiations of the radio protocols do not interfere with each other.

Prior art WO 2007/097941 A1 published on Aug. 30, 2007 describes a wireless network device, which includes a first media access controller (MAC) and a second media access controller (MAC). The first media access controller and the second media access controller are connected to a same baseband processor in communication with a radio frequency transmitter, which selectively transmits one of the signals outputted by the first and second media access controllers (MACs). An arbitration logic is suggested, which determines priority between the first and second media access controllers (MACs) according to a predetermined hierarchy and instructs selective switching of the output signals. A signal indicates to the media access controllers (MACs) whether communication is available or unavailable.

Prior art WO 2005/002257 A1 published on Jan. 6, 2005 describes a single radio apparatus, which supports multiple wireless communication standards in that communications with the multiple communication standards are operated by time interleaving of the communications. The single radio device of WO 2005/002257 A1 is configured to order the supported communication standards in a hierarchy to provide priority to certain communications. Time interleaving wireless communications over standards that support burst communications, such as time multiplexed wireless communication systems or wireless packet data systems, allow a single radio to seamlessly support multiple standards without loss of data.

However, the scheduling and/or arbitration methodologies suggested in the prior art do not meet the requirement of flexibility. In prior art, switching between roles and networks requires a full reconfiguration, which implies losing all ties to the past role and network, i.e. the device cannot restore its original state in the network without re-executing the network joining procedure

SUMMARY OF THE INVENTION

The present invention provides a networking device, a method of operating the networking device and a non-transitory computer readable medium storing computer readable instructions as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale. Because the illustrated examples of the present invention may for the most part be implemented using electronic components and circuits known to those skilled in the art, details will not be explained in any greater extent that that considered necessary.

DETAILED DESCRIPTION

Figure 1A:
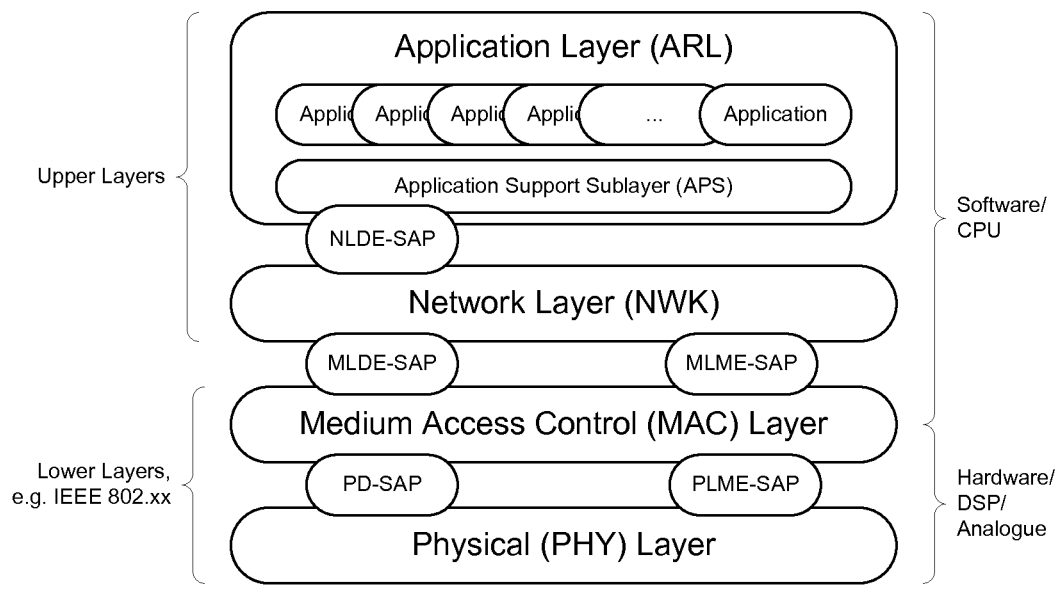
FIG. 1a schematically shows a block diagram illustrating a communication layer model.

In the following, the present application will also be described with reference to the (Institute of Electrical and Electronics Engineers) IEEE 802.15 standard, in particular to IEEE 802.15.4 standard and further applications implemented on the IEEE 802.15.4 transport will be further described as ZigBee application for the sake of illustration. However, it should be understood that the teaching of the present application is neither limited to any of the IEEE 802.xx standards nor to any specific transport implementation thereon.

Furthermore, it should be noted that reference to standards such as the IEEE 802.15.4 standard refer to the latest version of the respective standard available at the date of filing.

Examples of the present invention will be described with reference to and relate to parts of the layers based on ISO/OSI (International Organization for Standardization/Open System Interconnection) layer model. The ISO/OSI model is an ISO-standardized seven-layer reference model for describing modular manufacturer-independent communication systems. OSI stands for Open System Interconnection (Open system for communication links). The ISO/OSI model is used as a resource for describing open communication between various network appliances from different manufacturers. Most freely usable network protocols are based on this reference model, an example of such a network protocol being TCP/IP.

The OSI layers are defined such that they are based on one another and every single one can be implemented and used independently of the others. Data and signaling interfaces between the different layers are specifically defined to ensure interoperability thereof. The layers defined by the OSI may be divided into two main groups:

Lower layers representing the transport system: these define the communication channels physically and logically; and Upper layers representing the application system: they are used predominantly to show information.

The layers are usually shown such that lowest layer appears at the bottom and highest layer at the top. In real systems, the individual layers may not be always clearly separated from one another.

For instance, a network (NWK) layer performs the relaying and delivery of data packets. It also compiles routing tables and performs the routing per se. Packets to be forwarded are provided with a new intermediate destination address and are not sent to higher layers. Different network topologies are also coupled on this level.

A medium access control (MAC) layer organizes and monitors the access to the transmission medium. The bit stream is segmented on this level and is combined into packets. Furthermore, data can be subjected to an error check; for example, a checksum can be attached to a packet. It is also possible for the data to be compressed. Further features are sequence monitoring, time monitoring and flow control. The functionality of the medium access control (MAC) layer may be in a different form depending on the transmission medium (physical layer) used. Its main tasks usually include:

Recognizing where data packets (frames) start and stop in the bit stream received from the physical layer (when data are received);

Dividing the data stream into data packets (frames) and possibly inserting supplementary bits into the data packet structure so that the start and end of a data packet can be detected in the receiver (when data are transmitted);

Discerning transmission errors, for example by inserting a checksum when sending or by means of appropriate control calculations (when receiving);

Inserting or evaluating MAC addresses in the transmitter or receiver; and

Access control (e.g. which of the instances accessing the physical medium has the right to transmit?).

For the sake of completeness, it should be noted that the layer between the network (NWK) layer and the physical (PHY) layer is also denoted as data link layer, which comprises two sublayers: an upper sublayer denoted as the logical link control (LLC) layer and a lower sublayer denoted as the medium access control (MAC) layer. In the context of the description of the present invention, references to the medium access control (MAC) layer may be also understood to refer to the data link layer.

The physical (PHY) layer defines plug connections, wavelengths and signal levels. The bit sequences are converted into transmittable formats in this layer. The properties of the transmission media (cable, RF, optical fiber) are also defined here.

[FIG. 1a]

As shown in FIG. 1a, a physical (PHY) layer and a medium access control (MAC) layer may be implemented based on the OSI model and further exemplarily on the basis of the IEEE 802.15.14 standard. The physical (PHY) layer functions and medium access control (MAC) layer functions may be also determined by the hardware in addition to IEEE 802.15.4. Above the medium access control (MAC) layer, there is a network (NWK) layer, which adapts the physical (PHY) layer functions and medium access control (MAC) layer functions to suit the upper layers.

Service access points (SAPs) are conceptual locations and interfaces, respectively, at which one OSI layer can request the services of another OSI layer. As an example, PD-SAP or PLME-SAP in IEEE 802.15.4 can be mentioned, where the medium access control (MAC) layer requests certain services from the physical (PHY) layer.

The service access points (SAPs) are denoted according to the layer, with which they are associated: NLDE-SAP (network (NWK) layer data entity-service access point), NLME-SAP (network (NWK) layer management entity-service access point), MLDE-SAP (medium access control (MAC) layer data entity-service access point), MLME-SAP (medium access control (MAC) layer management entity-service access point), PD-SAP (physical device-service access point) and PLME-SAP (physical (PHY) layer management entity-service access point).

For instance, the MLME-SAP (medium access control (MAC) layer management entity—service access point) is the management service interface of medium access control (MAC) layer providing to network (NWK) layer and the PLME-SAP (physical (PHY) layer management entity—service access point) is the management service interface of physical (PHY) layer providing to medium access control (MAC) layer. The NLDE-SAP (network (NWK) layer management entity—service access point) is the data service interface of network layer providing for the application layer and the MLME-SAP (medium access control (MAC) layer management entity—service access point) is the data service interface of medium access control (MAC) layer providing for the network (NWK) layer.

The application support sublayer (APS) situated above the medium access control (MAC) layer defines the logical appliance type (device type) in the network, multiplexes the incoming data and is responsible for security mechanisms. Above the application support sublayer (APS), there are arranged the applications, which may be embedded in an application framework. The application support sublayer (APS) is connected to the applications via APSDE-SAPs (application support sublayer (APS) device entity-service access points) (not shown).

Figure 1B:
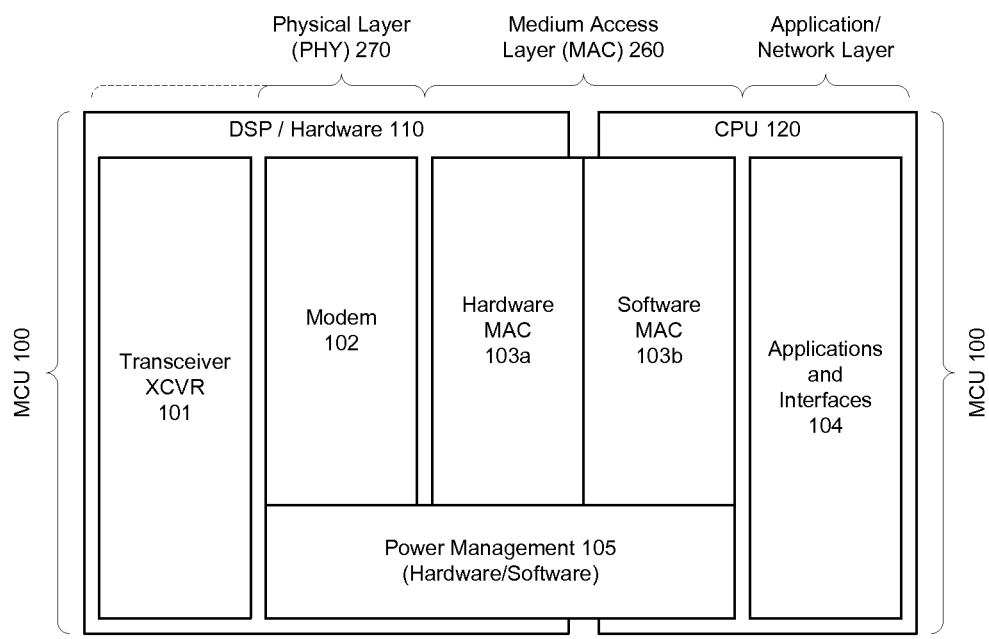
FIG. 1b depicts a schematic block diagram of an exemplary implementation of communication layers.

[FIG. 1b]

A schematic block diagram of an exemplary implementation of the functionalities of the different aforementioned layers is shown in FIG. 1b.

An analogue transceiver (XCVR) 101 may provide the interface between the transmission media (cable, RF, optical fiber) and digital modem for transmission and be associated with the transmission channel. The transceiver 101 may for instance considered to form the analogue portion of the physical (PHY) layer. The digital portion of the physical (PHY) layer 270 may be comprised of the digital modem 102, which is facilitated with a DSP in a DSP/hardware block 110. The DSP/hardware block 110 includes the digital modem 102, which is considered as a portion of the physical (PHY) layer 270, in conjunction with the transceiver (XCVR) 101. The hardware block 110 also includes a hardware portion 103a of the medium access control (MAC) layer 260. A power management function 105 may be also facilitated partly in the hardware block 110 and partly in an MCU/CPU domain 120. The MCU/CPU (microcontroller unit/central processing unit) domain 120 includes a software portion 103b of the medium access control (MAC) layer, the software medium access control (MAC) layer and includes a portion of the power management functionality 105. The MCU/CPU domain 120 is also illustrated as containing the (customer) application and the interface 104, as was described herein above. The exemplary illustrated implementation may be understood as a schematically illustrative example of a software defined radio (SDR), which extends from the customer interface all the way to the analogue transceiver (XCVR) 101. By incorporating the modem 102 in a DSP architecture, it can be configured with software to facilitate not only one standard such as the 802.15.4 standard but also other standards such as 802.xx standards, if desired. Further, the customer application can be changed in the MCU domain 120.

Figure 2A:
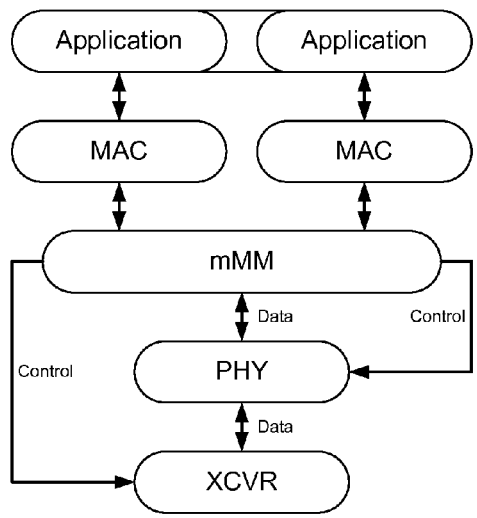
FIGS. 2a to 2c schematically show simplified block diagrams illustrating exemplary implementations of a multi-MAC manager (mMM) according to examples of the present invention on the basis of a communication layer model.
Figure 2B:
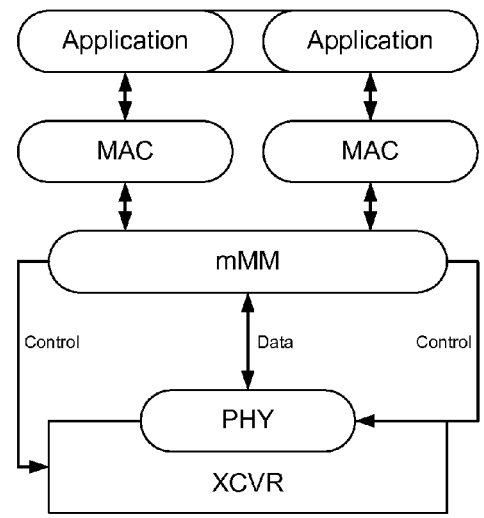
Figure 2C:
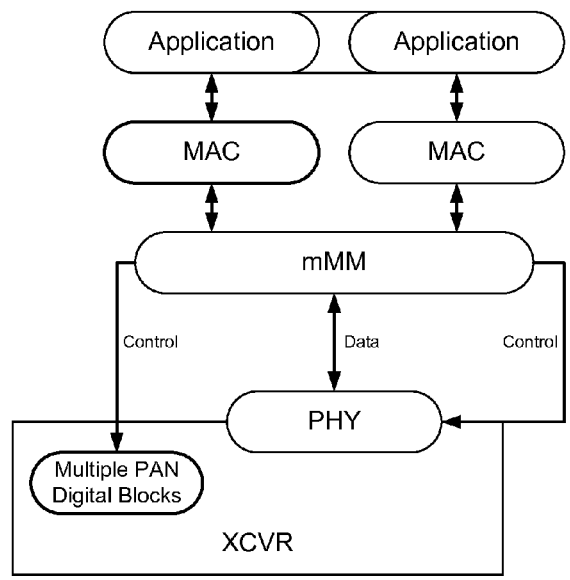

On the basis of the above description relating to the OSI (Open System Interconnection) layer model for abstraction of network stack implementation, exemplary implementations of examples of the present application will be understood. FIGS. 2a to 2c schematically show OSI layer models of examples of the present invention. The examples schematically illustrate a multi-MAC manager (mMM) interposed between the medium access control (MAC) layer and the physical (PHY) layer and the transceiver (XCVR) thereof, respectively. The multi-MAC manager (mMM) is suggested to interface directly to the service access points (SAPs) of the medium access control (MAC) layer and the service access point (SPAs) of the physical (PHY) layer. From upper layer perspective, multiple coordinated medium access control (MAC) instances are available for being used by application in particular at the same time and more particularly on multiple channels of the same data communication medium. Depending on the implementation of the multi-MAC manager (mMM), the applications in the application layer may be aware of the multiple coordinated medium access control (MAC) instances. For instance, the applications are executable in a single application framework and access to and may make use of anyone of the multiple coordinated medium access control (MAC) instances. The multiple coordinated medium access control (MAC) instances are assigned to the single application framework. Alternatively, several application frameworks may be present, within each of which one or more applications are executable and each of which is associated with one of the multiple coordinated medium access control (MAC) instances. In the first case, the applications in the application layer may have access to and may make use of any of the multiple coordinated medium access control (MAC) instances for network communications. In the other case the one or more applications of one application layer of the plurality thereof may have access to and may make use of the medium access control (MAC) instance of the plurality thereof assigned to the respective one application layer.

The multiple coordinated medium access control (MAC) instances interfaces the several (one, two or more) medium access control (MAC) instances to a single physical (PHY) layer. The logical communications requests from the several medium access control (MAC) instances (or several data link layer instances) are translated by the single physical (PHY) layer into hardware-specific operations to effect transmission and/or reception of electronic signals in accordance with the logical communications requests. The multi-MAC manager (mMM) is responsible for granting the access of a medium access control (MAC) instance to the physical (PHY) layer, e.g. granting the right to access and granting the (physical) access to the services provided by the physical (PHY) layer and the communication medium, respectively, when the transmission medium is available.

[FIGS. 2a to 2c]

The integration of the multi-MAC manager (mMM) between physical (PHY) layer and data link layer and medium access control (MAC) layer, respectively, may depend on the concrete, practical hardware implementation of the OSI layers in a device according to an example of the present invention. As illustrated in FIGS. 2a to 2c, the multi-MAC manager (mMM) is integratable into different hardware implementations. The multi-MAC manager (mMM) may make use of hardware acceleration of the functionalities of different OSI layers, in particular hardware acceleration of the physical (PHY) layer and/or the transceiver (XCVR). On the basis of the following description of the operability and the operative interoperability of the multi-MAC manager (mMM) according to an example of the present application with the further exemplary units of the apparatus the skilled person enabled to carry out the teaching of the present invention. In particular, it will be understood by those skilled in the art that the multi-MAC manager (mMM) as suggested in the present application is adaptable to fulfill its role in different protocol stack implementations. More particularly, the multi-MAC manager (mMM) as suggested in the present application may make use of the interfaces of the different layers described in brief above with reference to the service access points (SAPs), which may be defined on the basis of one or more standards.

Figure 3:
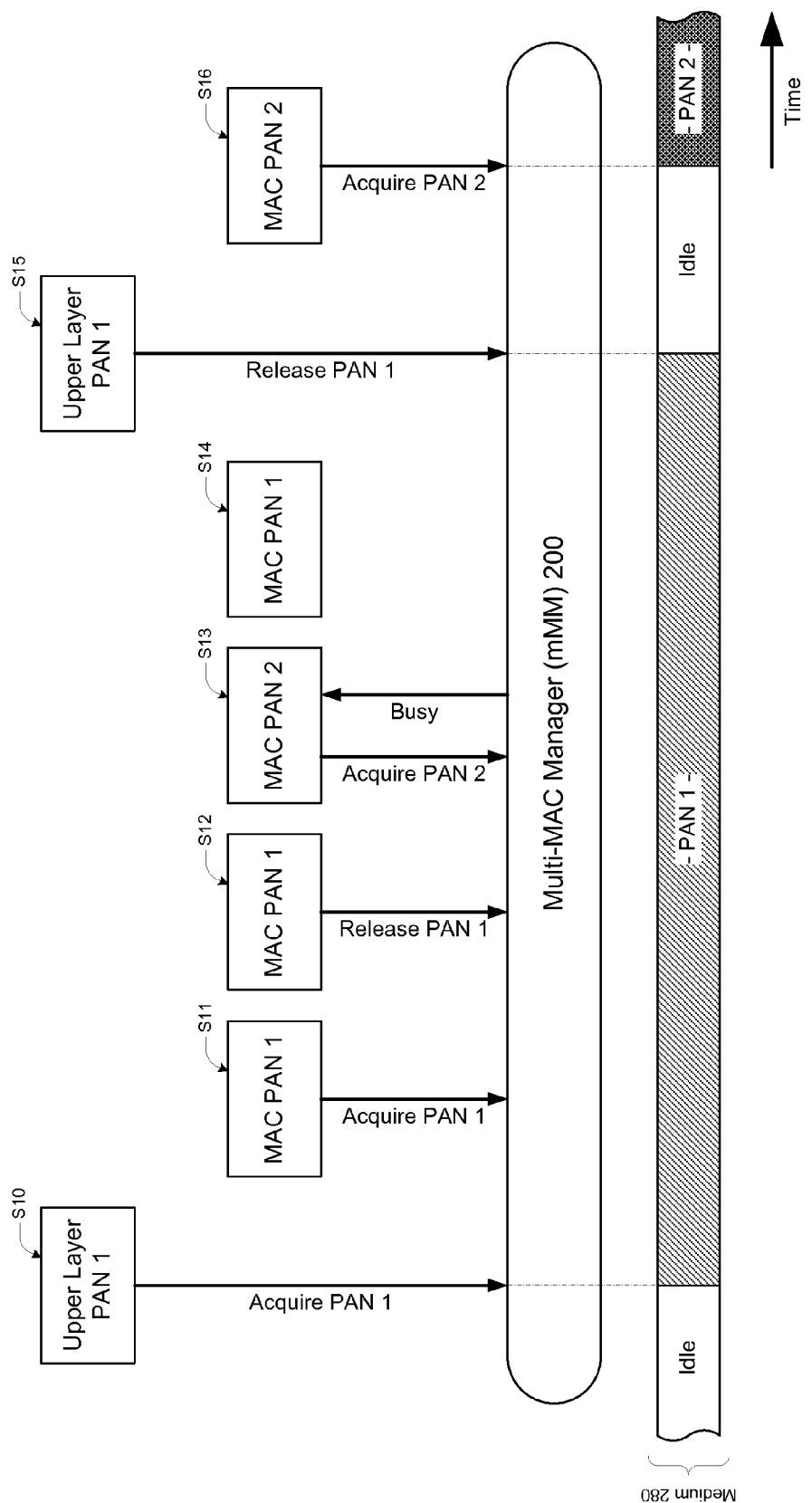
FIG. 3 schematically shows a simplified flow diagram illustrative of timely allocations of a communication medium to a medium access control (MAC) instance according to an example of the present invention.

Referring to FIG. 3, an illustrative operation of the multi-MAC manager (mMM) according to an example of the present invention is schematically illustrated with reference to two medium access control (MAC) instances. The medium access control (MAC) instances allow an apparatus implementing the exemplary multi-MAC manager (mMM) to act in two roles, which may be different roles but not limited thereto, on the same communication medium:

- as an entity (or network entity) participating in a first personal area network (PAN 1), and
- as an entity (or network entity) participating in a second personal area network (PAN 2).

In principle, the multi-MAC manager (mMM) according to an example of the present invention enables to implement several network identities or nodes from the network's perspective using a single physical layer and transceiver, respectively. The apparatus implementing the multi-MAC manager (mMM) appears as several virtual apparatuses coexisting at the same time and connected to the same communication medium e.g. on multiple channels thereof. Each medium access control (MAC) instance inter alia defines a respective (network) identity, such as MAC address and identities related thereto and derived thereof, from the network's point of view, respectively, where each (network) identify is considered as an individual and independent apparatus enabled for network communication in accordance with a defined transport specification and role. The transport specification includes inter alia but is not limited thereto Bluetooth and ZigBee transport. In the context of the description of the present invention, it should be understood that the layers referred to implement functionalities and services required for the one or more transports, protocols etc. supported by the apparatus implementing a multi-MAC manager (mMM) according to an example of the present invention. From application layer point of view, each medium access control (MAC) instance may be understood to represent an individual and independent protocol stack useable by one or more applications and providing data communications services thereto (e.g. communications services in respect of the medium access control (MAC) instance).

In an operation S10, the right to access a communication medium is limited to a specific medium access control (MAC) instance upon reception of a request to acquire a network identity of a specific personal area network (PAN), wherein the acquisition request is issued by an upper layer and received by the multi-MAC manager (mMM). As illustrated in FIG. 3, the acquisition request is exemplarily dedicated to request the grant of the right to access the communication medium to the medium access control (MAC) instance relating to the network identity for the first personal area network (PAN 1). In the following, the phrase network identity for the first personal area network (PAN 1) will be also denoted as first (network) identity for the sake of intelligibility. Further, the term access should be understood to include, but not limited thereto, polling of data, receiving of data, transmitting of data and/or listening for data. Provided that the physical (PHY) layer and/or the communication medium is/are available, e.g. the physical (PHY) layer and/or the communication medium is currently not allocated to another network identity, the communication medium is idle or an idle state operation is currently performed, which may be interrupted, the right to access is granted and limited to the requested network identity such as the first network identity. In other words, the physical (PHY) layer and the communication medium are exclusively available for requests relating to the first network identity and such requests are passed through by the multi-MAC manager (mMM). Exclusively availability should be understood that upon a successful acquisition request issued by an upper layer the communication medium is exclusively allocated for control and payload data transactions relating to the first personal area network (PAN 1). From a network point of view, the apparatus exposes the medium access control (MAC) instance corresponding to the first personal area network (PAN 1) and acts within the first personal area network (PAN 1) accordingly. Upon a successful acquisition request, the physical (PHY) layer and units associated therewith may be configured in accordance with configuration settings provided by the multi-MAC manager (mMM) for the respective medium access control (MAC) instance corresponding to the first personal area network (PAN 1). Exclusive availability is maintained until the upper layer issues a request to release the exclusive allocation as exemplarily illustrated in operation S15.

[FIG. 3]

It should be understood that the right to get granted the access to a communication medium is not only obtainable by an acquisition request issued by an upper layer. On the contrary, such acquisition may also be obtained through the medium access control (MAC) layer and in particular through the medium access control (MAC) layer in respect of specific a medium access control (MAC) instance. In a following operation S11, the first network instance may be acquired in response to an operation of the medium access control (MAC) layer for instance due to invocation of a service provided by the medium access control (MAC) instance corresponding to the first network entity (PAN 1). In the example illustrated in FIG. 3, the medium access control (MAC) instance for the first personal area network (PAN 1) has already access to the physical (PHY) layer and the communication medium due to the previous allocation in operation S10 upon acquisition request from the upper layer. Hereinafter, any data poll requests, data transmit requests or the like relating to the medium access control (MAC) instance corresponding to the first network entity (PAN 1) are immediately passed to the physical (PHY) layer and further to the communication medium 280, respectively.

In an operation S12, the allocation of the medium access control (MAC) instance corresponding to the first personal area network (PAN 1) may be released after an acquisition operation as illustrated with respect to operation S11. However, as illustrated in the example shown in FIG. 3, the allocation to the network entity of the personal area network (PAN 1) may be maintained until an upper layer, preferably the upper layer, which has originally requested the acquisition, requests to release the allocation thereto such as exemplarily illustrated in operation S15.

As long as the communication medium and the physical (PHY) layer is allocated to the first personal area network (PAN 1), respectively, acquisitions for other medium access control (MAC) instances such as shown in operation S13 of FIG. 3 are rejected. As exemplarily illustrated with reference to operation S13, any attempt to acquire the medium access control (MAC) instance corresponding to the second personal area network (PAN 2) (in other words the allocation of communication medium and the physical (PHY) layer for access thereto relating to the second personal area network (PAN 2), respectively) may be responded with a rejecting response such as a PHY (physical layer) busy response emulated by the multi-MAC manager (mMM).

As illustrated in operation S16, the attempt to acquire the second personal area network (PAN 2) is successful since the communication medium is idle and available at this point in time, respectively.

The maintaining of the allocation of the first personal area network (PAN 1) upon request to acquire the first personal area network (PAN 1) issued by an upper layer until a subsequent request to release (as exemplarily illustrated with regard to the operations S10 and S15 in FIG. 3) is in particular applicable in case a service of this upper layer is requested by an application. Such requested service offered by an upper layer may involve one or more (atomic) requests issued by lower layers which may be bound to a predefined sequence of operations, may be time critical, e.g. may have a predefined timing in accordance with a defined schedule, and/or have to be processed uninterruptedly. Accordingly, the allocation of e.g. the physical (PHY) layer to the medium access control (MAC) instance such as the first personal area network (PAN 1) should have to be maintained and the allocated physical access, e.g. the allocation of the communication medium to the medium access control (MAC) instance such as the first personal area network (PAN 1), should not be taken away in case the upper layer service requested by an application involves a sequence of requests, which have to be performed within time frame and/or sequential constrains to allow for a successful completion.

In order to enable the aforementioned operation of the multi-MAC manager (mMM), one or more service access points (SAPs) may be exposed to and accessible for one or more upper layers, in particular, the application layer, application support sublayer and/or application framework, to enable acquisition and release of a medium access control (MAC) instance and allocation of the physical (PHY) layer and communication medium, respectively. However as aforementioned, it should be noted that the acquisition and release a medium access control (MAC) instance and allocation of the communication medium and the medium access control (MAC) layer may not be only limited to acquisition requests from any upper layers. Such acquisition may be obtained upon request from and/or service invocation of any layer as exemplarily illustrated with regard to S16 of FIG. 3. Such acquisition should be successful if the communication medium is available, which means that communication medium is idle or an (idle) operation currently performed is interruptible.

Following examples should further illustrate the operation of the multi-MAC manager (mMM). For instance the IEEE 802.15.4 standard and further standards prescribe that during idle, which means that the medium access control (MAC) layer of a network apparatus does not perform a data exchange procedure such as polling data, transmitting data or receiving data. For instance, the network apparatus may listen on the communication medium whether there is incoming data targeting it. Accordingly, the transceiver (XCVR) and the medium access control (MAC) layer are set into listening operation mode, respectively. The listening operation mode and procedure thereof are performed with respect to a medium access control (MAC) instance. Such listening operation mode and the procedure thereof may be interrupted upon request for e.g. pulling data or transmitting data in respect of another medium access control (MAC) instance. A request may trigger the interruption and once the request in respect of the other medium access control (MAC) instance is completed, the listening operation mode and procedure thereof may be resumed. Further, in case two or more medium access control (MAC) instances require listening on the communication medium for incoming data the listening operation mode and procedure thereof may be performed in time scheduled alternation, in particular in periodic time cycles, which may have the same or different periods for instance according to priority ratings. The time periods may be adapted at runtime. The listening procedure may be performed on different channels of the communication medium in accordance with the respective medium access control (MAC) instance.

Further, the IEEE 802.15.4 standard and further standards prescribe that a scan operation performed with respect to one medium access control (MAC) instance may be not interrupted such as by any requests from other medium access control (MAC) instances or upper layer requests relating other medium access control (MAC) instances. In such a case, the allocation of the communication medium and the medium access control (MAC) is acquired exclusively for the one medium access control (MAC) instance until the scan operation is completed. Similar, an exclusive allocation of communication medium and the medium access control (MAC) layer for one medium access control (MAC) instance may also be necessary in case the (atomic) operations of a sequence of operations may not be interrupted to ensure successful completion of the sequence of operations as already mentioned above.

[FIG. 4]

Figure 4:
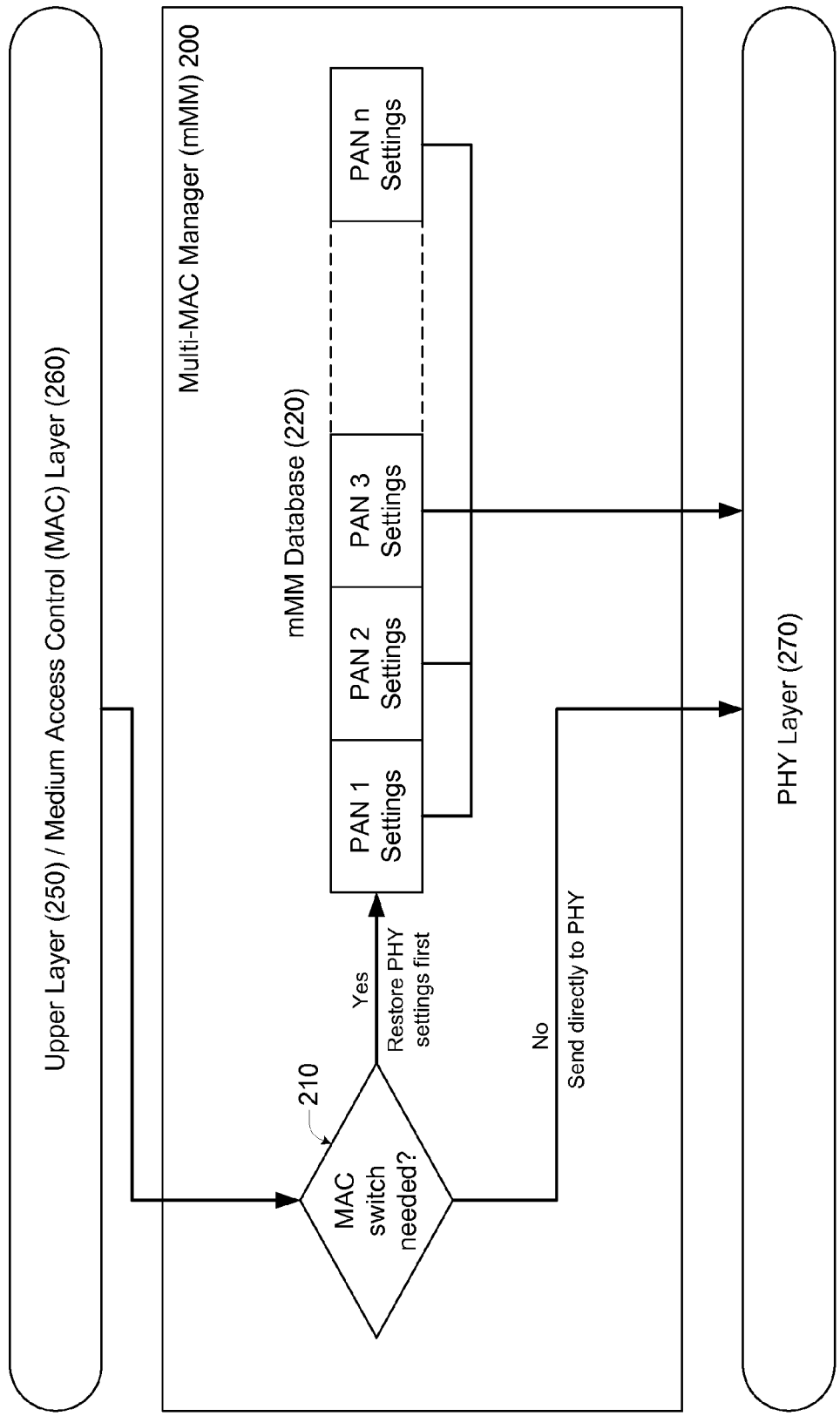
FIG. 4 schematically shows a simplified block diagram of a multi-MAC manager (mMM) according to an example of the present invention.

With reference to FIG. 4, a block diagram schematically showing a multi-MAC manager (mMM) according to an example of the present invention is depicted. The multi-MAC manager (mMM) 200 comprises a database 220 with one or more records of settings, wherein each record of settings is provided for a respective medium access control (MAC) instance: The database 220 and the records of settings thereof are managed by the multi-MAC manager (mMM) 200. Further, the multi-MAC manager (mMM) 200 comprises a switching unit 210, which is configured to detect whether a record of settings should be retrieved from the database 220 because the physical (PHY) layer and the communication medium is to be allocated to a medium access control (MAC) instance, a settings record relating to which is available in the database 220. If such allocation to a medium access control (MAC) instance is required, the respective record of settings for the medium access control (MAC) instance is first retrieved from the database 220 and at least the physical (PHY) layer 270 is configured accordingly on the basis of the retrieved settings record before any requests are passed to the physical (PHY) 270 layer. If such configuration is detected not to be necessary because the physical (PHY) 270 layer and the communication medium is already allocated accordingly, any requests are passed immediately to the physical (PHY) layer 270. The requests may be issued by any upper layer 250 or the medium access control (MAC) layer 260 for instance in response to service invocation thereof.

It should be noted that the database managed by the multi-MAC manager (mMM) according to an example of the present invention may be accessible for read and/or write operations, which means that a settings record may be read from the database 220 and that a new settings record may be written into the database 220 including e.g. allocating memory space for storage, overwriting a settings record or deleting one or more settings records before writing. Each settings record may be exposed to one or more of the superposed layers as individual medium access control (MAC) instance e.g. through one or more individual service access points (SAPs) thereof.

Figure 5:
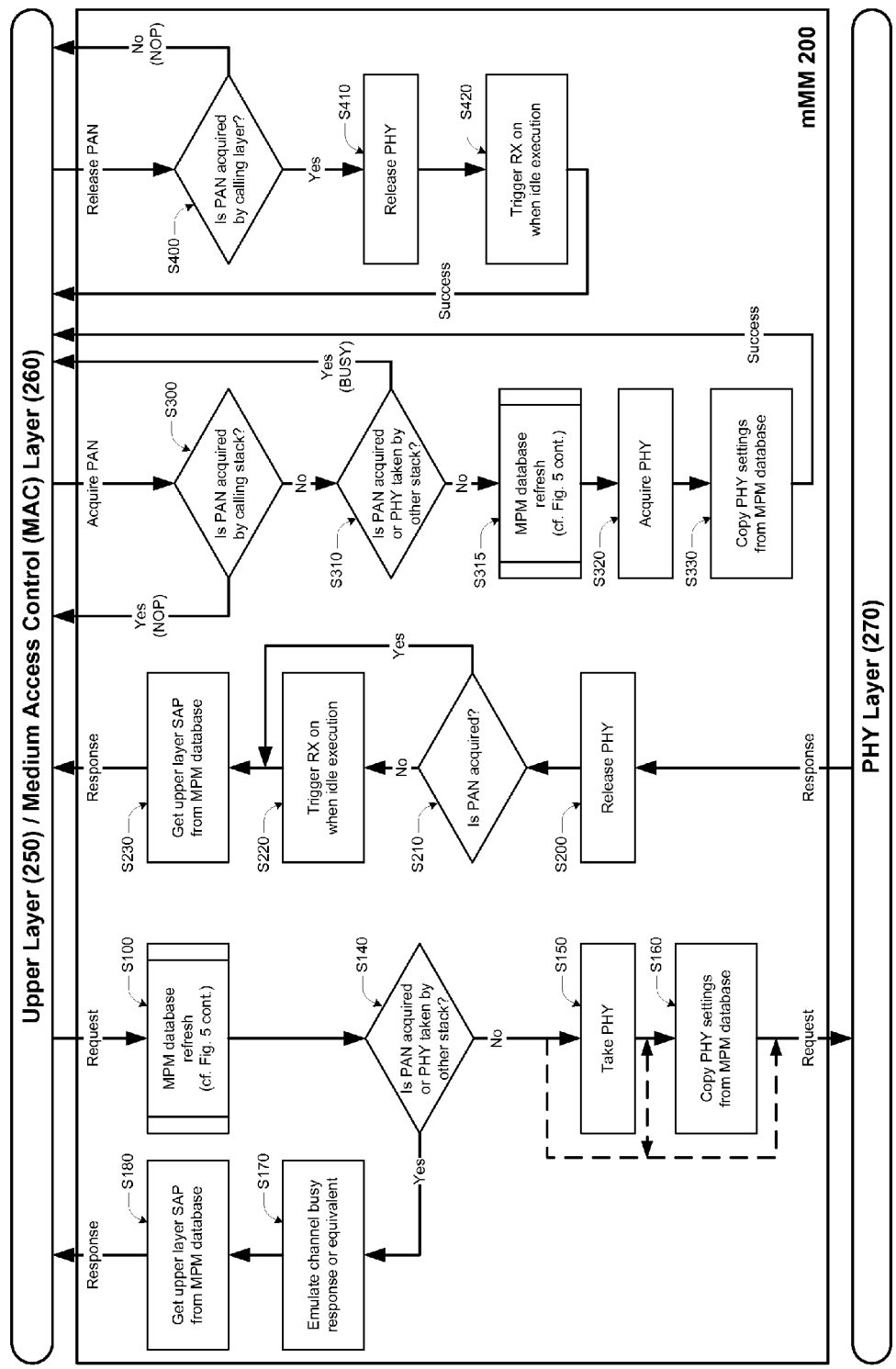
FIG. 5 and FIG. 5 continued (cont.) schematically show flow diagrams illustrating the operations of a multi-MAC manager (mMM) according to an example of the present invention.
Figure 5:
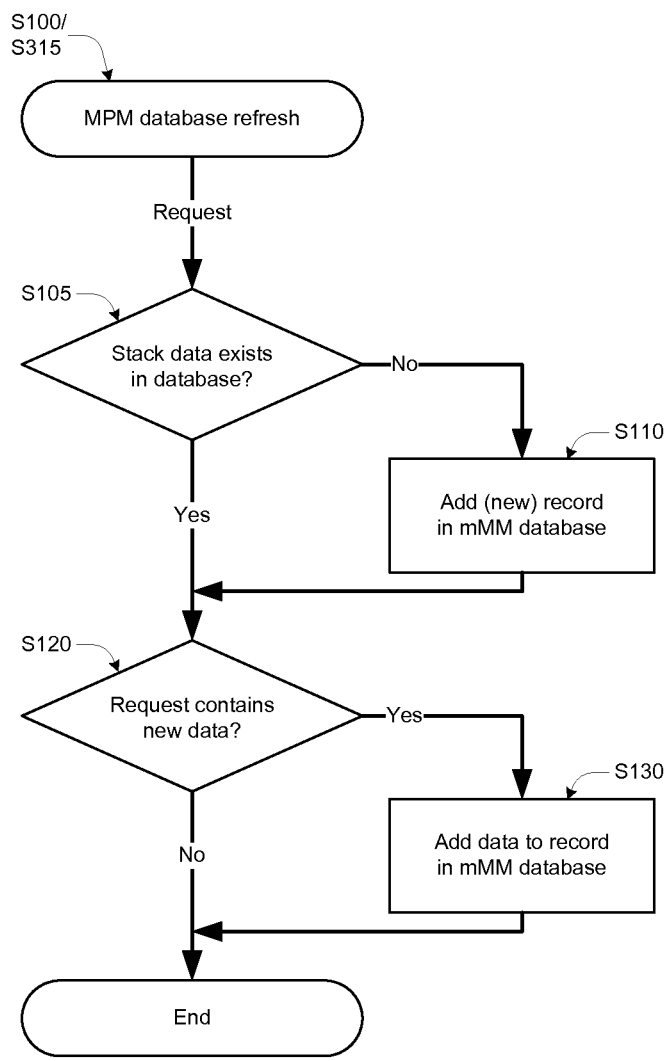

[FIGS. 5 and 5 Cont.]

Referring now to FIG. 5 schematically showing flow diagrams, the operation of a multi-MAC manager (mMM) according to an example of the present invention will be described more fully. Those skilled in the art will understand that flow diagrams further illustrate schematically interfaces or service access points (SAPs) of the multi-MAC manager 200 exposed to layer arranged above the multi-MAC manager 200 including in particular the upper layers 250 and the medium access control (MAC) layer 260, respectively, and the physical (PHY) layer 270.

A request issued by any upper layer 250 or the medium access control (MAC) layer 260 is received by the multi-MAC manager 200. In an operation S100, it is verified by e.g. the aforementioned switching unit 210 whether the mMM database 220 already comprises a settings record in accordance with the request relating to a specific medium access control (MAC) instance or an already existing settings record in the mMM database 220 may be updated.

The operation of operation S100 is further detailed in FIG. 5 (cont.), where in an operation S105, it is checked whether a settings record corresponding to the received request already exists. In an operation S110, a settings record may be added to the database of the multi-MAC manager (mMM) in case a settings record in accordance with the request does not already exist in the database 220. A settings record for a new medium access control (MAC) instance is created. The content of the settings record may be obtained from the received request and from previous requests eventually. In an operation S120, the content of the received request may be further analyzed in order to determine whether the content thereof contains new and/or update data, which may be relevant for the settings record. In an operation S130, in case new data, more recent data and/or updated data for the settings record is detected, the respective settings record of the medium access control (MAC) instance, to which the request relates, is updated accordingly in that for instance new data is added to the respective settings record and/or outdated data of the respective settings record is removed and/or replaced with new data.

In an operation S140, it is checked whether the communication medium 280 or/and the physical (PHY) layer 270 are available, which means whether the communication medium 280 or/and the physical (PHY) layer 270 are currently allocated due to a acquisition request from an upper layer (cf. operation S10 of FIG. 3 and description above referring thereto) or whether the communication medium 280 or/and the physical (PHY) layer 270 is currently "taken" by, or allocated to, another medium access control (MAC) instance due to a previous request, which is not completed yet (cf. operations S11/12 and S16 of FIG. 3 and description above referring thereto).

In case the communication medium or/and the physical (PHY) layer 270 are available for allocation, the request is to be passed to the physical (PHY) layer for further processing. If the communication medium or/and the physical (PHY) layer 270 is not already allocated to the medium access control (MAC) instance corresponding to the received request (for instance due to a acquisition request), the communication medium or/and the physical (PHY) layer 270 is "taken", or allocated, at least for this individual received request in an operation S150.

At least the physical (PHY) layer 270 may require (re-)configuration on the basis of the respective settings record of the medium access control (MAC) instance corresponding to the received request in operation S160 as exemplified with reference to FIG. 4. The components to be configured may comprise inter alia the modem 102, the transceiver XCVR 101 and further configurable parts and/or components associated with the physical (PHY) layer 270. The respective settings record is retrieved from the database 220 of the multi-MAC manager (mMM) 200 and the configuration data of the retrieved settings record required for configuration of at least the physical (PHY) layer 270 is copied therefrom and passed to at least physical (PHY) layer 270. The request follows once the configuration of at least physical (PHY) layer 270 has been completed and is processed and further passed by the physical (PHY) layer 270 configured accordingly to the communication medium 280. It should be noted that configuration operation S150 and/or operation S160 may be omitted in case the physical (PHY) layer 270 and the communication medium is already allocated and/or configured in correspondence with the received request. For instance as described in more detail below, the communication medium 280 or/and the physical (PHY) layer 270 may be allocated by an acquisition request from an upper layer 250. Upon such an acquisition request from an upper layer 250 the communication medium 280 or/and the physical (PHY) layer 270 are allocated accordingly until released by a release request from the upper layer 250, which originally issued the acquisition request preferably.

In case the communication medium or/and the physical (PHY) layer 270 is not available for allocation because the communication medium 280 or/and the physical (PHY) layer 270 is allocated to another medium access control (MAC) instance, the sequence branches after operation S140 to operation S170 and generates a response, which may be dedicated to be passed back to the layer, which has originally issued the request. The response may be generated to represent a physical (PHY) or medium access control (MAC) layer busy response, a channel busy response or any equivalent indication informing a terminating layer that the communication medium or/and the physical (PHY) layer 270 is currently not available. Information about the interface, through which the response is to be passed back, or the service access point(s) (SAPs), which may should be used, may be retrieved from the database 220 of the multi-MAC manager (mMM), in particular such information may be obtained from the settings record of the medium access control (MAC) instance, to which the originally issued request relates. It should be noted that the response, e.g. at least a part of the content and/or format thereof, the targeting layer etc. may also be defined in the database 220 of the multi-MAC manager (mMM), in particular in the settings record of the medium access control (MAC) instance, to which the originally issued request relates. Finally, the response is passed to the targeting layer, which may be the layer, which originally issued the request, through one or more service access points interfacing the communication of data and control information between layers.

The operation of operation S140, where it is checked whether the communication medium 280 or/and the physical (PHY) layer 270 are available, may be performed repeatedly including for instance a predefined waiting time between each repetition and further for instance over a predefined maximum number of repetitions. Hence, the "unavailability" of the communication medium 280 or/and the physical (PHY) layer 270 for allocation may be indicated only after the maximum number of repetitions of the operation of operation S140.

A response received from the communication medium is to be passed to the upper layer in accordance with the allocation of the communication medium 280 or/and the physical (PHY) layer 270 at the time of reception of the response. Upon receiving a response from the communication medium 280 via the physical (PHY) layer 270, the allocation of the communication medium 280 or/and the physical (PHY) layer 270 may be released in an operation S200. Such release of the allocation may be performed provided the allocation has been made in connection with a request as described with reference to operation S150; this means that the release in operation S200 should be omitted if the communication medium 280 or/and the physical (PHY) layer 270 has been allocated in connection with a request for acquisition as already mentioned above and described more fully in the following.

In case the communication medium 280 or/and the physical (PHY) layer 270 has been released in operation S200 and is not allocated to a medium access control (MAC) instance any more, one or more idle state operations may be executed. As exemplarily illustrated with reference to operation S220, a listen (idle state) operation may be triggered. In case the communication medium 280 or/and the physical (PHY) layer 270 is not available for idle state operations, operation S220 is skipped.

In an operation S230, information about the interface, through which the received response is to be further passed, or the service access point(s) (SAPs), which may should be used, and/or the targeting layer may be retrieved from the database 220 of the multi-MAC manager (mMM), in particular such information may be obtained from the settings record of the medium access control (MAC) instance to which the communication medium 280 or/and the physical (PHY) layer 270 has been allocated at the point in time at reception of the response. The response may be passed on in accordance with the retrieved information.

In operations S300 to S330, an exemplary operational sequence of the processing of an acquisition request according to an example of the present invention is shown. In a first operation S300, it is checked whether the communication medium 280 or/and the physical (PHY) layer 270 is already allocated to the medium access control (MAC) instance designated in the acquisition request form the upper layer 250. If the communication medium 280 or/and the physical (PHY) layer 270 is already allocated to the requested medium access control (MAC) instance, the operational flow returns to the upper layer 250. The success of the acquisition request may be indicated to the upper layer 250, which indication may further signalized to the upper layer that no operation (NOP) has been performed.

In an operation S310, it is checked whether the communication medium 280 or/and the physical (PHY) layer 270 are available, which means whether the communication medium 280 or/and the physical (PHY) layer 270 are currently allocated due to a acquisition request from an upper layer (cf. operation S10 of FIG. 3 and description above referring thereto) or whether the communication medium 280 or/and the physical (PHY) layer 270 is currently "taken" by, or allocated to, another medium access control (MAC) instance due to a previous request, which is not completed yet (cf. operations S11/12 and S16 of FIG. 3 and description above referring thereto).

In case the communication medium or/and the physical (PHY) layer 270 are available, the right to access the communication medium 280 or/and the physical (PHY) layer 270 is exclusively granted to subsequent access operations relating to the medium access control (MAC) instance designated in the acquisition request in an operation S320. In addition, the acquisition request issued by any upper layer 250 may be verified, e.g. by the aforementioned switching unit 210 of the multi-MAC manager 200, in an operation S315 whether the mMM database 220 already comprises a settings record in accordance with the acquisition request relating to a specific medium access control (MAC) instance or an already existing settings record in the mMM database 220 may be updated. The operation S315 is described above with reference to operations S100, S105, S110, S120 and S130 with respect to FIG. 5 (cont.); reference is made thereto.

At least the physical (PHY) layer 270 may require configuration on the basis of the respective settings record of the medium access control (MAC) instance corresponding to the received request in operation S330 as exemplified with reference to FIG. 4. The components to be configured may comprise inter alia the modem 102, the transceiver XCVR 101 and further configurable parts and/or components associated with the physical (PHY) layer 270. The respective settings record is retrieved from the database 220 of the multi-MAC manager (mMM) 200 and the configuration data of the retrieved settings record required for configuration of at least the physical (PHY) layer 270 is copied therefrom and may be passed to at least physical (PHY) layer 270. The success of the acquisition request may be indicated to the upper layer 250.

In case the communication medium or/and the physical (PHY) layer 270 is not available for allocation because the communication medium 280 or/and the physical (PHY) layer 270 are allocated to another medium access control (MAC) instance, a failure response, which may be dedicated to be passed back to the layer, which has originally issued the acquisition request. The failure response may be generated to represent a physical (PHY) or medium access control (MAC) layer busy response, a channel busy response or any equivalent indication informing a terminating layer that the communication medium or/and the physical (PHY) layer 270 is currently not available. Information about the interface, through which the response is to be passed back, e.g. the service access point(s) (SAPs), may be retrieved from the database 220 of the multi-MAC manager (mMM); in particular such information may be obtained from the settings record of the medium access control (MAC) instance, to which the originally issued request relates. It should be noted that the response, e.g. at least a part of the content and/or format thereof, the targeting layer etc. may also be defined in the database 220 of the multi-MAC manager (mMM), in particular in the settings record of the medium access control (MAC) instance, to which the originally issued request relates. Finally, the response is passed to the targeting layer, which may be the layer, which originally issued the request, through one or more service access points interfacing the communication of data and control information between layers.

The operation of operation S310, where it is checked whether the communication medium 280 or/and the physical (PHY) layer 270 are available, may be performed repeatedly including for instance a predefined waiting time between each repetition and further for instance over a predefined maximum number of repetitions. Hence, the "unavailability" of the communication medium 280 or/and the physical (PHY) layer 270 for allocation may be indicated only after the maximum number of repetitions of the operation of operation S310.

One the communication medium 280 or/and the physical (PHY) layer 270 are allocated due to an acquisition request, the allocation should be release by a release request, which may indicate, which medium access control (MAC) instance is to be released. In operations S400 to S420, an exemplary operational sequence of the processing of a release request according to an example of the present invention is shown.

In an operation S400, the release request from the upper layer 250 is parsed and it is verified whether the medium access control (MAC) instance indicated in the release request corresponds to the medium access control (MAC) instance, to which the communication medium 280 or/and the physical (PHY) layer 270 are currently allocated. In case the verification of operation S400 does not indicate a match thereof, the operational sequence returns to the upper layer 250. The failure of the release request may be indicated to the upper layer 250, which indication may further signalized to the upper layer that no operation (NOP) has been performed.

In case the verification of operation S400 indicates a match, the current allocation is released in an operation S410. Further one or more idle state operations may be executed after release of the allocation in an operation S420. As exemplarily illustrated with reference to operation S420, a listen (idle state) operation may be triggered. Finally, the operational flow returns back to the upper layer 250 and the success of the release request may be indicated thereto.

Figure 6:
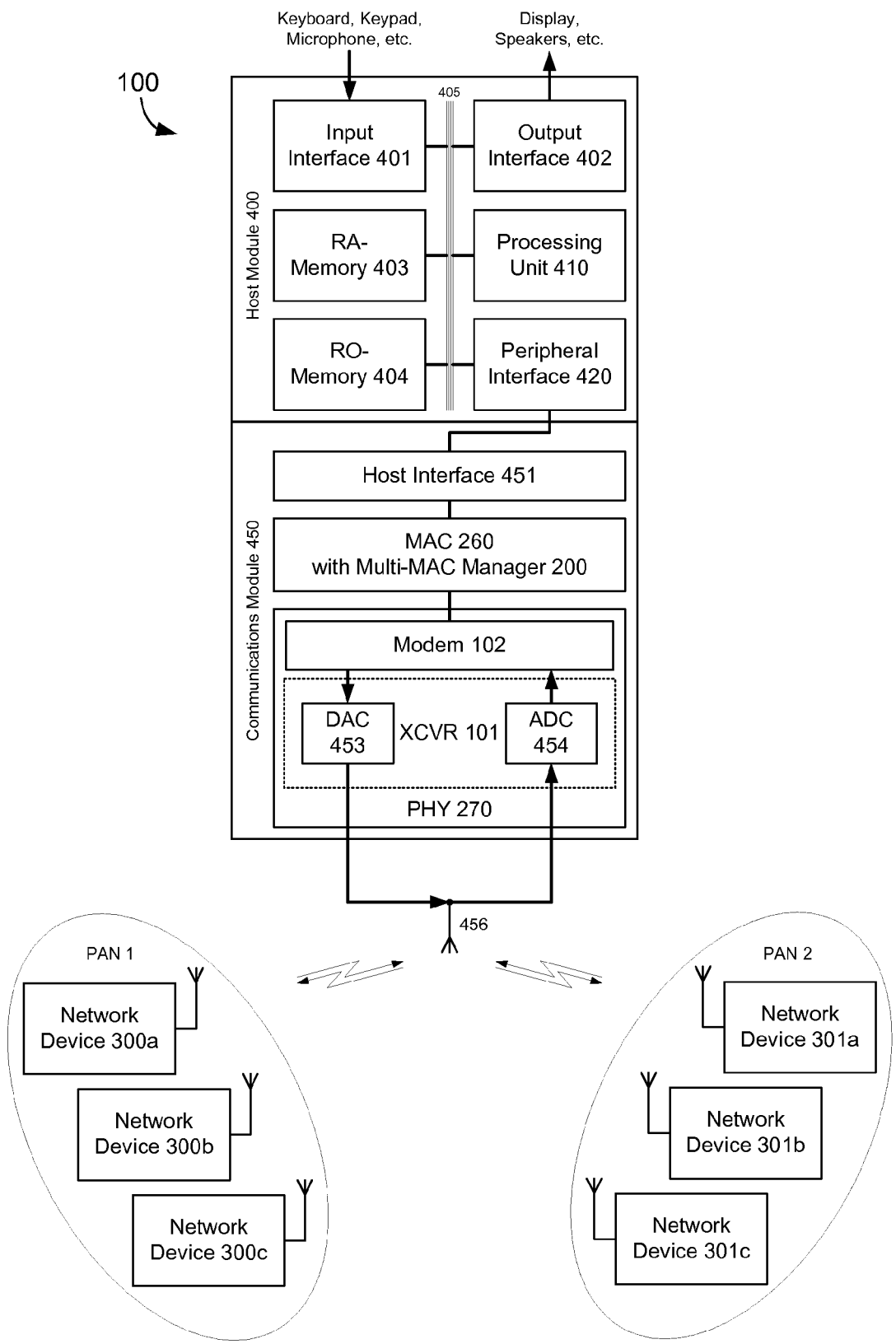
FIG. 6 schematically shows a simplified block diagram of a networking device with a multi-MAC manager (mMM) according to an example of the present invention.

The above-described methodology for managing several network entity instances is applicable with any communications enabled device such as the communications device embodied in FIG. 6 and described with reference thereto in the following. It should be understood that the communications device embodied in FIG. 6 is described with reference to a wireless communications and further in particular with reference to the IEEE 802.15.4 standard only for the sake of non-limiting illustration. The communications enabled device illustrated herein should be also understood to represent a networking device.

[FIG. 6]

FIG. 6 is a schematic block diagram illustrating a communications enabled device 100 that may be used as full-function device in an 802.15.4 network of wireless devices 300a to 300c and wireless devices 301a to 301c. As depicted, the communications enabled device 100 includes the host module 400 and at least one communications module 450, which may be integrated with or constructed separately from the components of the host module 400. It should be understood that the communications enabled device 100 may be a microcontroller unit (MCU) or a system-on-chip (SoC) being enabled for communication through a communication medium with one or more communications enabled devices. The host module 400 is exemplified to include a processing unit 410, random access memory 403, read-only memory 404, a peripheral interface 420, input interface 401 and output interface 402, but it will be appreciated that other components and configurations may be used, including but not limited to integrating an embedded microcontroller with associated program and data memory. However configured, the processing module 410 and memories 403, 404 cooperate to provide the specified host functionality, such as for instance a networking function, in which case the processing module 410 performs the corresponding communications functions in accordance with e.g. one or more wireless communications standards. The components of the host module 400 are operatably connected via one or more buses 405, which in particular may include one or more address buses, one or more data buses and/or one or more control buses. For data received from the communications module 450 (e.g., inbound data), the peripheral interface 420 provides the data via the bus 405 to the processing module 410 for further processing and/or routing to the output interface 402. The output interface 402 provides connectivity to one or more output display devices such as a display, monitor, speakers, etc., such that the received data may be displayed. In the other direction, the processing module 410 may receive the outbound data from one of one or more input devices such as a keyboard, keypad, microphone, sensor, etc. via the input interface 401 or generate the data itself. For data received via the input interface 401, the processing module 410 may perform a corresponding host function on the data and/or route it to a communications module 450 via the bus 405 and the peripheral interface 420, which provides the data to the communications module 450.

As for the communications module 450, there is provided a host interface 451, a media access control protocol (MAC) layer module 260, one or more separately selectable modem modules 102, a physical layer module (PHY) 270, a digital-to-analog converter (DAC) 453, and an analog-to-digital converter (ADC) 454 comprised by a transceiver module 101. Typically, transmit data coming from the host module 400 is presented to the MAC module 260 which, in selected examples, provides 802.15.4 compliant hardware support, such as control of packet transmission/reception, security-related encryption, error detection and control, and the like. The MAC module 260 presents the transmit data to the baseband modems 102, which modulate the data depending on the selected transmit mode. The data from the selected baseband modem 102 is presented to the PHY module 270, which processes the transmit data (encoding, modulation, etc.) and then outputs it to the DAC 453 for conversion to an analog signal if it has not been converted to the analog signal during the modulation process. The modulated analog signal or DAC output may then be gained, filtered and passed to the antenna section 456. On the receive side, the antenna section 456 output is passed to the PHY module 270 where it is gained, filtered and digitized into a digital signal by the ADC 454. The digital signal may be further processed by the PHY module 270 into digital representation and passed to the baseband modems 102, which demodulate the bits depending on which transmission mode was used to send the received data. The demodulated data is passed through the MAC module 260 to the host for delivery to the output interface 451. As will be appreciated, one or more of the modules in the communications module 450 may be implemented with dedicated hardware, alone or in combination with a communications processor and an associated memory for storing and executing instructions that control the access to the physical transmission medium in the wireless network.

The MAC module 260 further comprises a multi-MAC manager (mMM) 200, which allows for (quasi-) simultaneous participation in the first personal area network PAN 1 and communication with the network devices 300a to 300c thereof as well as the second personal area network PAN 2 and communication with the network devices 301a to 301c thereof. The communications enabled device 100 exposes different network identities to the personal area networks (PANs) in accordance with to the medium access control (MAC) instances. The multi-MAC manager (mMM) 200 is configured to manage the medium access control (MAC) instances in accordance with the methodology illustratively described above with reference to FIG. 5.

The methodology illustratively described above with reference to FIG. 5 is also applicable in case the different network identities (and medium access control (MAC) instances, respectively) operate with different roles within the respective network. For the sake of illustration, reference is made the so-called ZigBee communication standard, which designates a specification for a suite of high-level communication protocols used to create personal area networks built from small, low-power digital radios. ZigBee is based on an IEEE 802.15 standard. Though low-powered, ZigBee devices can transmit data over long distances by passing data through intermediate devices to reach more distant ones, creating a mesh network, a network without centralized control, or high-power transmitter/receiver able to reach substantially all of the networked devices. The decentralized nature of such wireless ad hoc networks makes them suitable for applications where a central node may not be relied upon.

The ZigBee standard defines different communication modes including a beacon (BEACON) mode for performing intermittent operations and bandwidth guaranteed communications, and a non-beacon mode for making direct communications mutually among all nodes. The beacon mode is intended to be used in a star network, which is centered at a network management node called the "PAN (Personal Area Network) coordinator." The PAN coordinator periodically transmits a beacon signal, while other nodes make communications within durations assigned thereto in synchronism with the beacon signal. One node assigned by the coordinator can solely occupy a channel to make communications without collisions and is utilized for communications, for which a low latency is required. On the other hand, the non-beacon mode is a mode for accessing channels at all times in accordance with CSMA-CA. When the non-beacon mode is used in a mesh link which directly communicates with peripheral nodes, each node can directly make a communication at all times, but must be waiting for reception such that it can receive data destined thereto at all times, so that the power cannot be saved by intermittent operations as in the beacon mode.

Figure 7A:
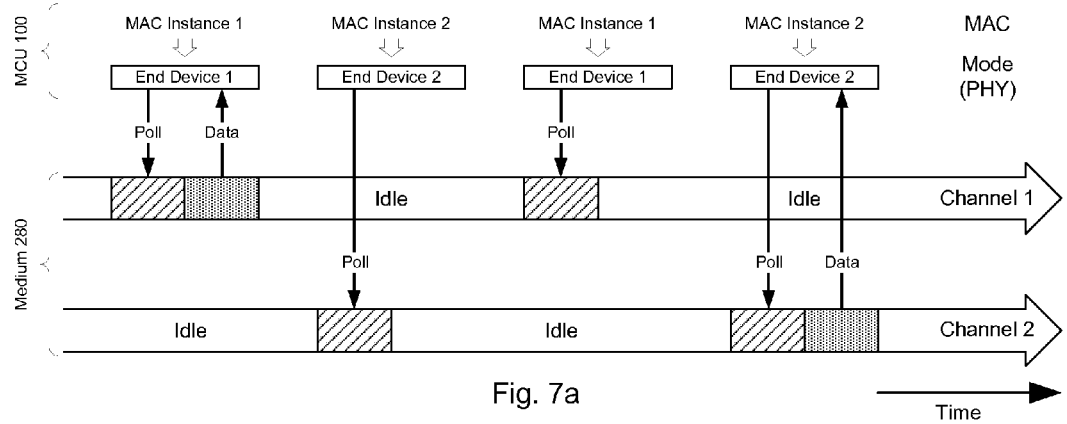
FIGS. 7a to 7c schematically show illustrative timely allocations of a communication medium to a medium access control (MAC) instance according to examples of the present invention.
Figure 7B:
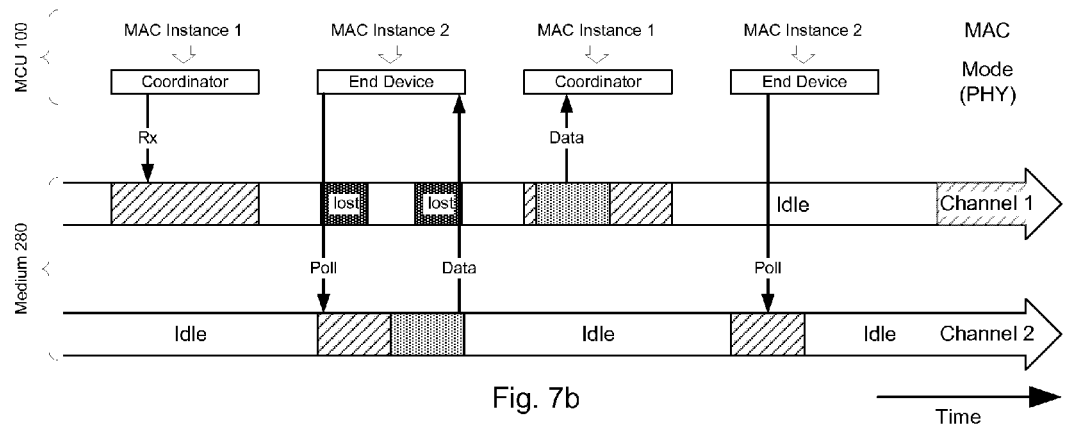
Figure 7C:
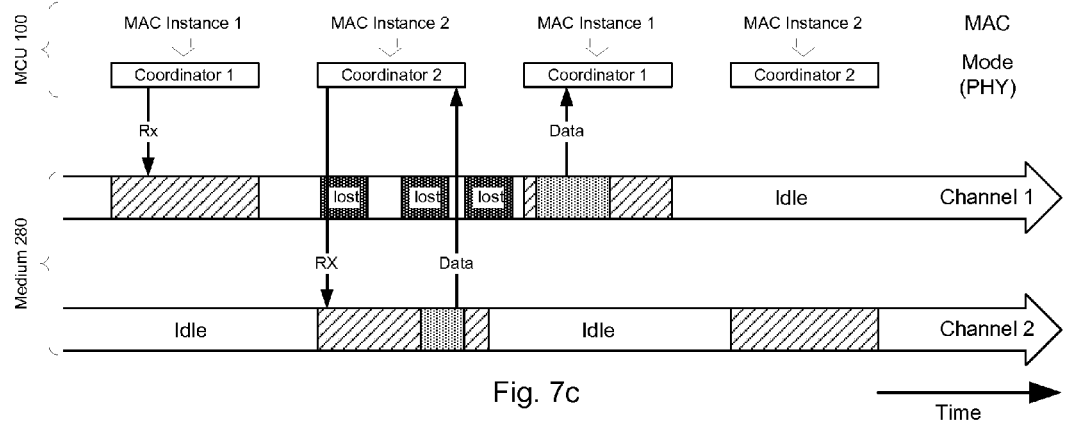

[FIGS. 7a to 7c]

FIGS. 7a to 7c illustrate exemplarily three examples, in which the network identities (and medium access control (MAC) instances, respectively) operate in the same or different communication modes and roles. The communication modes include the so-called "End Device" mode and the so-called "Coordinator" mode. In brief summary, "End Device" mode means inter alia that a poll request is to be sent indicating that data may be transmitted if available. "Coordinator" mode means inter alia that it is listened on the communication medium for targeting data transmissions.

FIG. 7a illustrates an example, where both the medium access control (MAC) instance 1 and medium access control (MAC) instance 2 are defined to instruct and operate in "End Device" communication mode, respectively. The medium access control (MAC) instances 1 and 2 may be allocated in a time sequence, in particular according to a schedule plan. Upon allocation of the respective medium access control (MAC) instance 1 or 2, a poll request is sent, which is responded by a data transmission if data is pending for the respective allocated medium access control (MAC) instance 1 or 2. In particular, the poll requests are transmitted on (virtual or physical) channels 1 and 2 of the communication medium 280, respectively, each of which channel is associated with the respective medium access control (MAC) instance 1 or 2.

FIG. 7b illustrates an example, where the medium access control (MAC) instance 1 is defined to instruct and operate in "Coordinator" communication mode, respectively, and the medium access control (MAC) instance 2 is defined to instruct and operate in "End Device" communication mode. The medium access control (MAC) instances 1 and 2 may be allocated in a time sequence, in particular according to a schedule plan. Upon allocation of the medium access control (MAC) instance 1, it is listened for data on the communication medium 280, which is transmitted if there is any pending data for the medium access control (MAC) instance 1. Upon allocation of the medium access control (MAC) instance 2, a poll request is sent, which is responded by a data transmission if data is pending for the allocated medium access control (MAC) instance 2. Data transmission intended for the medium access control (MAC) instance 1 operating in "Coordinator" communication mode may be missed if transmitted during the medium access control (MAC) instance 2 is allocated. In "Coordinator" communication mode, it should be listened on the communication medium for data transmissions all the time since data transmissions may occur at any time. Loss of data due to missed data transmissions may be compensated by data retransmission procedures, which may be carried out by the medium access control (MAC) layer and any of the upper layers. In particular, it is listened for data transmissions on a (virtual or physical) channel 1 of the communication medium 280, which channel is associated with the medium access control (MAC) instance 1, and the poll requests are transmitted on a (virtual or physical) channel 2 of the communication medium 280, which channel is associated with the medium access control (MAC) instance 2.

FIG. 7c illustrates an example, where both the medium access control (MAC) instance 1 and medium access control (MAC) instance 2 are defined to instruct and operate in "Coordinator" communication mode, respectively. The medium access control (MAC) instances 1 and 2 may be allocated in a time sequence, in particular according to a schedule plan. Upon allocation of the medium access control (MAC) instance 1 or 2, it is listened for data on the communication medium 280, which is transmitted if there is any pending data for the respective medium access control (MAC) instance 1 or 2. Data transmission intended for the medium access control (MAC) instance 1 operating in "Coordinator" communication mode may be missed if transmitted during the medium access control (MAC) instance 2 being allocated and data transmission intended for the medium access control (MAC) instance 2 operating in "Coordinator" communication mode may be missed if transmitted during the medium access control (MAC) instance 1 being allocated. Loss of data due to missed data transmissions may be compensated by data retransmission procedures, which may be carried out by the medium access control (MAC) layer and any of the upper layers. In particular, it is listened for data transmissions on (virtual or physical) channels 1 and 2 of the communication medium 280, respectively, each of which channel is associated with the respective medium access control (MAC) instance 1 and 2.

According to an example of the present application, a networking device 100 is provided, which comprises a processing enabled host module 400, a network communications interface 450 and a multi-MAC manager (200). The network communications interface 450 comprises a physical layer, PHY, part 270 and a medium access control, MAC, part 260 and is operably connected to the processing enabled host module 400 to provide data communication service to one or more applications 104 executed thereat. The multi-MAC manager 200 is operably connected to the medium access control, MAC, part 260, and the PHY part 270 and comprises a storage 220 for storing several medium access control, MAC, instances. Each MAC instance has a network identity for being exposed via the communications interface 450 on a communication medium 280. The network identities are different from each other. An application making use of the data communications services of the network communications interface 450 requests the data communications service via a MAC instance of the multi-MAC manager 200. The multi-MAC manager 200 configures the network communication interface 450 to acquire a respective network identify in accordance with the MAC instance. The requested data communications service are performed in the context of the acquired network identify. The MAC manager 200 is configured to receive a request issued in the context of a medium access control, MAC, instance, to determine S100 the MAC, instance, to which the request relates, and to determine S140 whether the PHY part 270 is available for allocation or already allocated to the MAC instance. If the PHY is available, The MAC manager 200 is further configured to allocate S150, S160 at least the PHY part 270 of the communications interface 450 to the MAC instance and to pass the received request to the PHY part 270 of the communications interface 450 for further processing thereat. The MAC manager 200 is further configured to release at least the allocated PHY part 270 of the communications interface 450 once a service requested by the received request is completed.

According to an example of the present application, the MAC manager 200 is further configured to receive a request to acquire the network identify of a MAC instance. Upon receipt of such a request, the MAC manager 200 is configured to determine whether the PHY part is available for allocation or already allocated to the MAC instance and allocate at least the PHY part of the communications interface to the requested MAC instance if the PHY part is available. Upon allocation, the allocated PHY part 270 of the communications interface 450 is exclusively available for communications transactions relating to the acquired network identify until released in response to receipt of a request to release. The MAC manager (200) is further configured to receive a request to release an acquired network identity and release the PHY part 270 of the communications interface 450 upon reception of a request to release the acquired network identity. The request to release an acquired network identity is a valid request if the request origins from the entity, which has issued the previous request for acquiring the network identity. The entity may be at least one of an application and an upper layer part of the communication stack associated with the MAC instance including among others the MAC layer.

According to an example of the present application, the PHY part is available for allocation if the PHY part is not allocated to another MAC instance of if the PHY part 270 is not acquired by a network identity of another MAC instance. The PHY part is also available if the network communications interface currently performs an idle operation.

According to an example of the present application, the communications interface is configured to listen on the communication medium for data destined for one or the medium access control, MAC, instances in idle operation.

According to an example of the present application, the networking device further comprises a database 220, which is configured to store several medium access control, MAC, instances. The database 220 comprises settings records, each of which relates to one or the MAC instances. The networking device further comprises a switching unit 210. The switching unit 210 is configured to retrieve a settings record in accordance with a MAC instance and to provide the retrieved settings record to at least the PHY part 270 for configuring at least the PHY part 270 of the communications interface 450 upon allocation thereof to the MAC instance such that the communication interface acquires the network identify of the MAC instance.

According to an example of the present application, the multi-MAC manager 200 is further configured to provide settings data to one or more components of at least the PHY part 270 of the communications interface 450 upon allocation thereof.

According to an example of the present application, the multi-MAC manager 200 is part of the medium access control, MAC, part 260 of the communications interface 450.

According to an example of the present application, the MAC instances are available for concurrent use from a point of view of an application carried out at the networking device and the communications interface exposes only one network identify corresponding to the allocated MAC instance at the same time from network point of view.

According to an example of the present application, each MAC instance is part of a separate and individual protocol stack providing the data communications service to one or more applications carried out at the networking device 100.

According to an example of the present application, the MAC manager 200 is further configured to analyze the received request and to determine whether the request relates to a new MAC instance, which is not part of the stored MAC instances. If the request relates to a new MAC instance, the MAC manager 200 is further configured to create a new MAC instance on the basis of information obtained from the received request. The new MAC instance is stored in the storage 220.

According to an example of the present application, if the request relates to a MAC instance being part of the stored MAC instances the MAC manager 200 is further configured to update the stored MAC instance on the basis of information obtained from the received request.

According to an example of the present application, the MAC part 260 and the PHY part 270 are part of a stack implementation in accordance with at least one of the Bluetooth standard issued by the Bluetooth Special Interest Group (SIG), the Institute of Electrical and Electronics Engineers, IEEE, standard 802.x, and the ZigBee standard issued by the ZigBee Alliance. In particular, the MAC part 260 and the PHY part 270 are part of a stack implementation in accordance with the IEEE standards 802.15.x, more particularly the IEEE standard 802.15.4.

According to an example of the present application, a method of operating a networking device 100 is provided. A request issued in the context of a medium access control, MAC, instance, is received at a multi-MAC manager (200) of a communication interface (450) of the networking device (100). The network communications interface 450 comprises a physical layer, PHY, part 270 and a medium access control, MAC, part 260 and is operably connected to a processing enabled host module 400 of the networking device 100. The network communications interface 450 provides data communications service to one or more applications (104) executed at the processing enabled host module 400 of the networking device 100. The MAC instance is determined, to which the request relates among a several medium access control, MAC, instances stored at a storage 220 of the MAC manager 200. Each MAC instance has a network identity for being exposed via the communications interface 450 on a communication medium 280. The network identities are different from each other. It is determined whether the PHY part 270 is available for allocation or already allocated to the MAC instance. If the PHY is available, at least the PHY part 270 of the communications interface 450 is allocated to the MAC instance. The received request is passed to the PHY part 270 of the communications interface 450 for further processing thereat. At least the allocated PHY part 270 of the communications interface 450 is released once a service requested by the received request is completed.

According to an example of the present application, a request to acquire the network identify of a MAC instance is received. It is determined whether the PHY part 270 is available for allocation or already allocated to the MAC instance. If the PHY part 270 is available, at least the PHY part 270 of the communications interface 450 is allocated to the requested MAC instance. The allocated PHY part 270 of the communications interface 450 is provided exclusively for communications transactions relating to the acquired network identity of the MAC instance until released in response to receipt of a request to release. Upon receiving a request to release the acquired network identity of the MAC instance, the acquired PHY part 270 of the communications interface 450 is released upon reception of a request to release.

According to an example of the present application, during the communications interface (450) being in idle operation, it is listened on the communication medium 280 for data destined for one or the medium access control, MAC, instances.

According to an example of the present application, the allocating of at least the PHY part 270 of the communications interface 450 further comprises retrieving settings information from the storage 220 and configuring at least the PHY part (270) on the basis of the retrieved settings information. Each of the MAC instances stored at the storage 220 comprises settings information relating to the respective MAC instance. The settings information enable to configure at least the PHY part of the communications interface 450 such that the network identity of the MAC instance is exposed on the communication medium 280.

According to an example of the present application, the received request is analyzed S100 and it is determined S105 whether the request relates to a new MAC instance, which is not part of the stored MAC instances. If the request relates to a new MAC instance, a new MAC instance is created S110 on the basis of information obtained from the received request.

According to an example of the present application, if the request relates to a MAC instance being part of the stored MAC instances, it is determined S120 whether the request include new data and the stored MAC instance is updated S130 on the basis of information obtained from the received request.

According to an example of the present application, if the PHY part 270 is unavailable (not available), a busy response is emulated or generated and the emulated busy response is transmitted to the source of the request.

The above advantages are exemplary and these or other advantages may be achieved by the proposed solution. Further, the skilled person will appreciate that not all advantages stated above are necessarily achieved by examples described herein.

The proposed solution may also be implemented in a computer program product stored in a non-transitory computer-readable storage medium that stores computer-executable code, which causes a processor computer to perform the operation of the multi-MAC manager 200 and/or the exemplary method as illustrated in FIGS. 4 and 5, for instance. A processor comprising the multi-MAC manager 200 of the present application is also claimed.

A computer program product is a list of instructions such as a particular application program and/or an operating system. The computer program may for example include one or more of: a subroutine, a function, a procedure, an object method, an object implementation, an executable application, an applet, a servlet, a source code, an object code, a shared library/dynamic load library and/or other sequence of instructions designed for execution on a computer system. The computer program may be stored internally on computer readable storage medium or transmitted to the computer system via a computer readable transmission medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; non-volatile memory unit storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as an operation to users and programs of the system. The computer system may for example include at least one processing unit, associated memory unit and a number of input/output (I/O) devices such as embodied in FIG. 6 and described above with reference thereto. When executing the computer program, the computer system processes information according to the computer program and produces resultant output information via I/O devices.

In the foregoing specification, the invention has been described with reference to specific examples of the invention. It will be, however, evident that various modifications and changes may be made therein without departing from the broader spirit and scope of the invention as set forth in the appended claims. For example, the connections may be a type of connection suitable to communication signals from or to the respective nodes, units or devices, for example via intermediate devices. Accordingly, unless implied or stated otherwise the connections may for example be direct connections or indirect connections.

Because the apparatus implementing the present invention is composed of, for the most part, electronic components and circuits known to those skilled in the art, details of the circuitry and its components will not be explained in any greater extent than that considered necessary as illustrated above, for the understanding and appreciation of the underlying concepts of the present invention and in order not to obfuscate or distract from the teachings of the present invention.

Some of the above embodiments, as applicable, may be implemented using a variety of different circuitry components. For example, the exemplary topology in the figures and the discussion thereof is presented merely to provide a useful reference in discussing various aspects of the invention. Of course, the description of the topology has been simplified for purposes of discussion, and it is just one of many different types of appropriate topologies that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements. For example, the memory 403 and 404 of FIG. 6 may be integrated with other memory or logical components, e.g. the processing unit 410, in the processing communications enabled device 100.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple examples of a particular operation, and the order of operations may be altered in various other embodiments.

Also for example, the examples, or portions thereof, may implemented as soft or code representations of physical circuitry or of logical representations convertible into physical circuitry, such as in a hardware description language of any appropriate type.

Moreover, the invention is not limited to physical devices or units implemented in non-programmable hardware but may also be applied in programmable devices or units able to perform the desired device functions by operating in accordance with suitable program code. Furthermore, the devices may be physically distributed over a number of apparatuses, while functionally operating as a single device. Devices functionally forming separate devices may be integrated in a single physical device.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or operations then those listed in a claim. Furthermore, the terms "a" or "an", as used herein, are defined as one or as more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an". The same holds true for the use of definite articles. Unless stated otherwise, terms such as "first" and "second" are used to distinguish arbitrarily between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A networking device, comprising
a processing enabled host module,
a network communications interface comprising a physical layer, PHY, part and a medium access control, MAC, part and operably connected to the processing enabled host module to provide data communication service to one or more applications executed thereat; and
a multi-MAC manager operably connected to the MAC part and the PHY part and comprising a storage for storing several MAC instances, wherein each MAC instance has a network identity for being exposed via the communications interface on a communication medium, wherein the network identities are different from each other,
wherein the MAC manager is configured to:
  receive a first request issued in the context of a MAC instance;
  determine the MAC instance to which the first request relates;
  determine whether the PHY part is available for allocation or already allocated to the MAC instance;
  if the PHY is available, allocate at least the PHY part of the communications interface to the MAC instance, pass the received first request to the PHY part of the communications interface for further processing thereat, and release at least the allocated PHY part of the communications interface once a service requested by the received first request is completed;
  receive a second request to acquire the network identify of a MAC instance;
  determine whether the PHY part is available for allocation or already allocated to the MAC instance:
  if the PHY part is available, allocate at least the PHY part of the communications interface to the second requested MAC instance, wherein the allocated PHY part of the communications interface is exclusively available for communications transactions relating to the acquired network identity of the MAC instance until released in response to receipt of a request to release;
  receive a request to release an acquired MAC instance; and
  release the acquired PHY part of the communications interface upon reception of the request to release the acquired network identity.

2. The networking device of claim 1,
wherein the PHY part is available for allocation if the PHY part is not allocated to another MAC instance, the PHY part is not acquired by a network identity of another MAC instance or the network communications interface currently performs an idle operation.

3. The networking device of claim 1,
wherein the communications interface is configured to listen on the communication medium for data destined for one of the MAC instances in idle operation.

4. The networking device of claim 1, comprising:
a database configured to store MAC instances, wherein the database comprises settings records, each of which relates to one of the MAC instances; and a switching unit configured to retrieve a settings record in accordance with a MAC instance and to provide the retrieved settings record to at least the PHY part for configuring thereof upon allocation.

5. The networking device of claim 1, wherein the multi-MAC manager is further configured to provide settings data to one or more components of at least the PHY part of the communications interface upon allocation thereof.

6. The networking device of claim 1, wherein the multi-MAC manager is part of the medium access control, MAC, part of the communications interface.

7. The networking device of claim 1, wherein from a point of view of an application carried out at the networking device, the MAC instances are available for concurrent use, wherein from network point of view, the communications interface exposes only one network identify corresponding to the allocated MAC instance at the same time.

8. The networking device of claim 1, wherein each MAC instance is part of a separate and individual protocol stack providing the data communications service to one or more applications carried out at the networking device.

9. The networking device of claim 1, wherein the MAC manager is further configured to analyze the received first request; determine whether the received first request relates to a new MAC instance, which is not part of the stored MAC instances; and if the received first request relates to a new MAC instance, create a new MAC instance on the basis of information obtained from the received first request.

10. The networking device of claim 9, wherein the MAC manager is further configured to if the received first request relates to a MAC instance being part of the stored MAC instances, update the stored MAC instance on the basis of information obtained from the received first request.

11. A method of operating a networking device, comprising:
receiving, at a multi-MAC manager of a communication interface of a networking device, a first request issued in the context of a medium access control, MAC, instance,
wherein the network communications interface comprises a physical layer, PHY, part and a medium access control, MAC, part and is operably connected to a processing enabled host module of the networking device to provide data communications service to one or more applications executed thereat;
determining the MAC instance, to which the first request relates among several MAC instances stored at a storage of the MAC manager, wherein each MAC instance has a network identity for being exposed via the communications interface on a communication medium, wherein the network identities are different from each other;
determining whether the PHY part is available for allocation or already allocated to the MAC instance;
if the PHY is available, allocating at least the PHY part of the communications interface to the MAC instance, passing the received first request to the PHY part of the communications interface for further processing thereat, and releasing at least the allocated PHY part of the communications interface once a service requested by the received first request is completed;
receiving a second request to acquire the network identify of a MAC instance; and
determining whether the PHY part is available for allocation or already allocated to the MAC instance;
if the PHY part is available, allocating at least the PHY part of the communications interface to the second requested MAC instance, providing exclusively the allocated PHY part of the communications interface for communications transactions relating to the acquired network identity of the MAC instance until released in response to receipt of a request to release;
receiving a request to release an acquired MAC instance; and
releasing the acquired PHY part of the communications interface upon reception of a request to release the acquired network identity.

12. The method of claim 11, further comprising listening on the communication medium for data destined for one of the MAC instances during the communications interface being in idle operation.

13. The method of claim 11, wherein the allocating of at least the PHY part of the communications interface further comprises
retrieving settings from the storage, wherein each of the MAC instances stored at the storage comprises settings relating to the respective MAC instance;
configuring at least the PHY part on the basis of the retrieved settings.

14. The method of claim 11, further comprising
analyzing the received first request;
determining whether the first request relates to a new MAC instance, which is not part of the stored MAC instances; and
if the first request relates to a new MAC instance, creating a new MAC instance on the basis of information obtained from the received first request.

15. The method of claim 14, further comprising
if the first request relates to a MAC instance being part of the stored MAC instances, updating the stored MAC instance on the basis of information obtained from the received first request.

16. The method of claim 11, further comprising
if the PHY part is unavailable, emulating a busy response; and
transmitting the emulated busy response to the source of the first request.

* * * * *